United States Patent
Keller et al.

(10) Patent No.: US 6,946,529 B2
(45) Date of Patent: Sep. 20, 2005

(54) METHOD FOR PRODUCING AN AQUEOUS POLYMER DISPERSION BY RADICAL AQUEOUS EMULSION POLYMERIZATION WITH A CONTINUALLY PRODUCED AQUEOUS MONOMER EMULSION

(75) Inventors: Andreas Keller, Boehl-Iggelheim (DE); Werner Schackert, Schifferstadt (DE); Gerald Wildburg, Speyer (DE); Heiko Wolf, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/475,221

(22) PCT Filed: Apr. 17, 2002

(86) PCT No.: PCT/EP02/04247

§ 371 (c)(1),
(2), (4) Date: Oct. 20, 2003

(87) PCT Pub. No.: WO02/085955

PCT Pub. Date: Oct. 31, 2002

(65) Prior Publication Data

US 2004/0116595 A1 Jun. 17, 2004

(30) Foreign Application Priority Data

Apr. 19, 2001 (DE) .......................................... 101 19 330

(51) Int. Cl.$^7$ ................................................. C08F 2/22
(52) U.S. Cl. ........................ 526/88; 526/319; 526/920; 422/131; 422/135
(58) Field of Search ................................ 422/131, 135; 526/88, 319, 920

(56) References Cited

U.S. PATENT DOCUMENTS

| | | | | |
|---|---|---|---|---|
| 4,418,183 A | * | 11/1983 | Chiang ......................... | 526/80 |
| 4,458,057 A | * | 7/1984 | Basu ............................ | 526/88 |
| 4,968,741 A | * | 11/1990 | Burroway et al. ........... | 524/710 |
| 5,169,918 A | * | 12/1992 | Tomishima et al. ........ | 526/344.2 |
| 5,990,221 A | * | 11/1999 | Dames et al. ................ | 524/457 |
| 6,160,049 A | * | 12/2000 | Mathauer et al. ........... | 524/804 |
| 6,177,525 B1 | * | 1/2001 | McKee et al. ................ | 526/87 |
| 6,538,059 B1 | * | 3/2003 | Muller et al. ................ | 524/591 |

FOREIGN PATENT DOCUMENTS

| | | | |
|---|---|---|---|
| DE | 196 48 744 | 5/1998 | |
| DE | 198 09 220 | 9/1999 | |
| EP | 0 373 439 | 6/1990 | |
| EP | 0 575 625 | 12/1993 | |
| WO | WO 9802466 A1 * | 1/1998 | ............. C08F/2/22 |
| WO | WO 9807757 A1 * | 2/1998 | ............. C08F/2/22 |

OTHER PUBLICATIONS

Kirk–Othmer Encyclopedia of Chemical Technology, 3$^{rd}$ ed., vol. 1, pp. 397–401 Jan. 1978.
Kirk–Othmer Encyclopedia of Chemical Technology, 3$^{rd}$ ed., vol. 14, pp. 92–97 Apr. 1981.
Encyclopedia of Polymer Science and Engineering, vol. 6, pp. 10–21 and 48–51 1986.

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

A method for producing an aqueous polymer dispersion by radical emulsion polymerization of an aqueous monomer emulsion, wherein the monomer emulsion is produced continually according to consumption by mixing the components thereof using a mixing device.

12 Claims, No Drawings

METHOD FOR PRODUCING AN AQUEOUS POLYMER DISPERSION BY RADICAL AQUEOUS EMULSION POLYMERIZATION WITH A CONTINUALLY PRODUCED AQUEOUS MONOMER EMULSION

The present invention relates to a process for preparing an aqueous polymer dispersion by free-radical emulsion polymerization of an aqueous monomer emulsion using a continuously prepared aqueous monomer emulsion.

In the preparation of aqueous polymer dispersions by emulsion polymerization, distinctions are generally made between batch, semibatch, and continuous processes, and different methods of adding the monomers to the reaction vessel are described.

Kirk-Othmer, Encyclopedia of Chemical Technology, 3rd edition, vol. 1, p. 397 ff. describes a semibatch process of emulsion polymerization, taking as its example the industrial polymerization of acrylic esters. A monomer emulsion prepared in a separate batching vessel is passed continuously into the polymerization reactor, wherein it is admixed with an aqueous initiator solution and polymerized.

Kirk-Othmer, Encyclopedia of Chemical Technology, 3rd edition, vol. 14, p. 92 ff. contains a comparative overview of batch, semibatch, and continuous processes in emulsion polymerization. According to a general procedure for a semibatch process, the emulsion feed stream may comprise all of the ingredients used for the emulsion polymerization, such as monomers, surface-active substances, water, and regulators, for example, with the aqueous monomer emulsion being prepared in a separate batching vessel, referred to as the feed tank. However, the initiator must not be mixed into the monomer emulsion here, since otherwise polymerization might take place in the feed tank.

The Encyclopedia of Polymer Science and Engineering, vol. 6, p. 10 ff. (1986) likewise describes batch, semibatch, and continuous reactors for emulsion polymerization. As before, one possible variant of the batch and semibatch process that is described is the preparation in a separate batching vessel of an aqueous monomer emulsion which may comprise all of the emulsion constituents apart from the initiator. The initiator is passed directly into the polymerization reactor, in a separate feed. In the case of the continuous processes described, the monomers are supplied to the reactor(s) continuously either without prior emulsification together with the aqueous phase or in the form of an aqueous monomer emulsion prepared and stored separately.

Semibatch processes, where a continuous feed is supplied to a stirred reactor but no product is taken off during the reaction, are preferred over the batch processes. It is easy to vary the composition of the feed and the initial charge and so to prepare a large number of different dispersions in one and the same reactor. Besides these benefits, further advantages of the semibatch process lie in its increased safety, owing to the small amounts of monomer present in the reactor as compared with the batch process, and in better dissipation of the heat of reaction, especially in the case of dispersions, where there is a sharp increase in viscosity during the polymerization. Furthermore, the possibility of regulating the rates of addition of the monomers or of the monomer emulsion and thus of improved reaction control is an advantage.

In the semibatch process, for example, the monomers may be supplied to the polymerization reactor in straight form as a single feed, separately from the supplying of the initiator, as described, for example, in EP-A-0 575 625. As likewise described above, other techniques for adding the monomers to the polymerization reactor include addition together with the aqueous phase, without prior emulsification, and addition of a monomer emulsion prepared in a separate batching vessel.

Prior art processes involving adding the monomers in unemulsified or straight form have the following disadvantages:

a) The energy required to emulsify the monomers has to be applied by the stirrer of the polymerization reactor. This necessitates either the use of special, expensive, in some cases complex, and difficult-to-clean stirrers or an increase in the power input into the reaction mass by increasing the stirrer speed or using larger stirrers. The latter measures result in an increase in the shearing load on the dispersions and thus in increased formation of coagulum.

b) If emulsification in the reactor is inadequate, a pure monomer phase may form in the reactor: the less dense, as yet unreacted monomer forms a coherent layer floating on the remainder of the reaction mass. After the end of the emulsion feed, the cooling effect of the cold feed streams is absent and there may be a sharp temperature increase in the interior of the vessel owing to the reaction of this concentrated monomer phase. Moreover, the reaction of such a concentrated monomer phase results in increased formation of coagulum and in a high level of polymer deposition on the walls and internals of the reactor and on the stirrers.

The above-described prior art semibatch processes, where an aqueous monomer emulsion is supplied continuously to the polymerization reactor, all necessitate the preparation and provision of this emulsion in a separate vessel before the reaction begins. This variant process, however, has the following disadvantages:

a) The initiator cannot be mixed into the monomer emulsion since otherwise polymerization in the feed vessel would be likely. Separate supply of initiator into the reactor, however, results in a local increase in electrolyte concentration at the entry site, leading to increased, unwanted formation of coagulum.

b) The emulsions used for aqueous free-radical emulsion polymerization are thermodynamically unstable, which means that the monomer emulsion may separate owing to coalescence of the monomer droplets and a monomer phase may form in the feed vessel. At the same time, emulsifier is released, and may form micelles in the reactor and thus initiate the growth of a further, unwanted particle generation. Moreover, the supplying of a pure monomer phase that has formed at the end of the feed may give rise to the above-described problems due to sharp increase in temperature, increased formation of coagulum, and reactor contamination.

c) For the preparation of dispersions with a relatively high concentration, the aqueous monomer emulsion supplied to the polymerization reactor must have a high monomer content. This generally leads to emulsions having a high viscosity and thus to problems associated with the conveying of these emulsions. Moreover, highly concentrated aqueous monomer emulsions in particular have a tendency to separate or break.

None of the abovementioned documents indicates the use of a continuously prepared aqueous monomer emulsion for preparing polymer dispersions by free-radical aqueous emulsion polymerization.

The applicant's own application DE-A 19648744 provided a process which prevented the disadvantages described above, particularly the increased formation of coagulum, the soiling of the polymerization vessel, and an increase in temperature shortly before or after the end of the monomer addition. An essential feature of that process is that the monomer emulsion is prepared continuously at the rate of its consumption, the components of the monomer emulsion being mixed to the emulsion using a mixing means. As suitable mixers, it specifies particularly static and dynamic mixers of a very wide variety of designs, which may be used in any order, arrangement, and combination.

It is an object of the present invention to improve further the process described in the aforementioned application and in particular to bring about further reductions in the coagulum content of the aqueous polymer dispersions and in the soiling of the polymerization vessel by polymer deposits.

We have found that this object is achieved by preparing the aqueous monomer emulsion, prepared continuously at the rate of its consumption, using a mixing means which comprises at least one nozzle selected from solid cone nozzle, hollow cone nozzle, fan jet nozzle, smooth jet nozzle, injector nozzle, ejector nozzle, spiral nozzle, impingement jet nozzle, and two-fluid nozzle or emulsifying baffle.

The invention accordingly provides a process for preparing an aqueous polymer dispersion by free-radical emulsion polymerization of an aqueous monomer emulsion prepared continuously at the rate of its consumption using a mixing means to mix its components, wherein said mixing means comprise at least one nozzle selected from solid cone nozzle, hollow cone nozzle, fan jet nozzle, smooth jet nozzle, injector nozzle, ejector nozzle, spiral nozzle, impingement jet nozzle, and two-fluid nozzle or emulsifying baffle.

For preparing emulsions using nozzles the prior art describes a process for generating pharmaceutical or cosmetic emulsions using a special jet disperser, in EP-A 101007. Another method of mixing hard-to-mix fluids in order to form an emulsion is disclosed in DE-A 4128999. The core of said application is a process in which two mutually insoluble liquid phases are guided together in the form of thin, flat layers in opposing jets to form an emulsion. Neither of these documents, however, discloses or suggests the preparation of aqueous monomer emulsions and their use for preparing aqueous polymer dispersions.

The process of the invention is suitable for preparing homopolymers and copolymers, so that at least one momonomer-containing feed stream is supplied to the mixing means for continuous preparation of the monomer emulsion. The supply of two or more monomers may be carried out separately or in the form of mixtures, which may be produced, for example, by combining the individual feed streams in a common pipeline.

The monomers may be supplied in pure form (oil phase) or together with water to the mixing means. It is preferred to add at least one dispersant to aqueous monomer feed streams before they enter the mixing means for preparing the monomer emulsion.

The initiator is added by way of a separate feed stream, generally in aqueous phase, although it is possible to combine monomer feed stream and initiator feed stream prior to entry into the mixing means. The initiator may also be introduced into the reactor directly, independently of the monomer emulsion.

The remaining components of the monomer emulsion, which are defined in more detail below, are added, depending on their comparability, together with one of the abovementioned feed streams or separately in pure form, as a solution in water or an appropriate solvent.

When the process of the invention is performed as a semibatch process, it is preferred to include a portion of the aqueous phase and, if desired, of one or more of the monomers and/or the other components of the monomer emulsion in an initial charge to the reactor.

The components may be supplied to the mixing means by customary methods. These include, for example, the direct addition of all of the components or the formation of appropriate premixes.

In one suitable embodiment of the process of the invention for preparing copolymers, for example, a mixture of one or more water-soluble monomers, at least one dispersant, and, if desired, further additives, as a first feed stream, may be combined with an aqueous solution of an initiator, as a second feed stream, combination taking place, for example, in a common pipeline section. It is then possible to add, for example, at least one water-insoluble monomer in pure form (oil phase), as a third feed stream, to this mixture, where appropriate by way of a metering means. The mixture of the three feed streams is emulsified continuously at the rate of their consumption in a mixing means, as described at length below, and supplied directly to the reaction vessel.

As the mixing means for the continuous preparation of the aqueous monomer emulsion it is also possible in the process of the invention to use one or more of the mixers described in DE-A 19648744. These mixers may be of identical or different design, and are used in any order, arrangement, and combination: examples include serial arrangement of all the mixers, combinations of parallel and serial arrangement, and parallel arrangement of all the mixers. Where two or more mixers are used, serial arrangement is preferred. An essential aspect of the process, however, is that the mixing means comprise at least one mixer comprising a nozzle selected from solid cone nozzle, hollow cone nozzle, fan jet nozzle, smooth jet nozzle, injector nozzle, ejector nozzle, spiral nozzle, impingement jet nozzle, and two-fluid nozzle or emulsifying baffle. Particular preference is given to a mixer arrangement in which the mixer comprising the nozzle is the mixer which forms the ready-to-use monomer emulsion inline immediately before entry into the polymerization vessel.

In accordance with the invention, spiral nozzles, injector nozzles or ejector nozzles are preferably used for this purpose. Particular preference is given, however, to injector nozzles.

It is advantageous for the mixing means to comprise at least one of the abovementioned nozzles and a mixing chamber. It is particularly advantageous for the nozzle and the mixing chamber to be arranged such that the components of the aqueous monomer emulsion are passed first through the nozzle and immediately thereafter through the mixing chamber.

The dimensioning of the nozzle that is to be used is dependent, among other factors, on the type of nozzle, on the volume flow of the components that are to be mixed, on their viscosity, on their temperature, on the pressure difference between nozzle inlet aperture and nozzle outlet aperture, etc., and may be derived by the skilled worker in a simple way (in this regard see, for example, M. Stang, Zerkleinern und Stabilisieren von Tropfen beim mechanischen Emulgieren [Size reduction and stabilization of droplets in mechanical emulsifying], VDI-Fortschrittsberichte, series 3, Verfahrenstechnik No. 527, VDI-Verlag 1998, Dusseldorf; R. Adler et al. in Verfahrenstechnische Berechnungsmethoden part 5, Chemische Reaktoren—Ausrüstungen und Berechnungen [Chemical reactors—equipment and calculations], Deutscher Verlag für Grundstoffindustrie, Leipzig, 1979) or may be determined in simple preliminary experiments. In every case, the nozzle size and the other conditions are to be chosen such that in the course of passage through the nozzle of the components that are to be mixed the nonaqueous components are finely dispersed in the aqueous phase to form a stable aqueous monomer emulsion. This occurs in particular when the pressure difference between nozzle inlet aperture and nozzle outlet aperture is at least 0.5 bar. In many cases a much higher pressure difference is set; for example, $\geq 1$ bar, $\geq 5$ bar, $\geq 10$ bar, $\geq 20$ bar, $\geq 50$ bar, $\geq 100$ bar, $\geq 500$ bar, $\geq 1\,000$ bar or even up to 2 000 bar, and all values in between.

Where necessary, the mixing means may comprise two or more differently dimensioned nozzles through which the volume flow of the components may be passed in a controlled manner in order to form an emulsion. This is especially advantageous when, in the course of the emulsion polymerization, highly different volume flows of the monomer emulsion are required. At the beginning and at the end of emulsion polymerization, in particular, there is frequently a need for smaller volume flows of the monomer emulsion. By means of a suitable measurement and control circuit, or manually, it is then always possible to activate the nozzle or a combination of two or more, serial or parallel nozzles, which ensures optimum fine dispersing to form a stable monomer emulsion.

It is advantageous for there to be mounted at the nozzle outlet aperture a component known as a diffusor, which through its approximately conical form assists the formation of the aqueous monomer emulsion and provides for its uniform and directed transport away from the nozzle. Where the aqueous monomer emulsion formed flows around the diffusor, as is the case, for example, when the diffusor protrudes into a pipe or a mixing chamber that has a larger cross section than the largest cross section of the diffusor, the mixing effect may be intensified by the formation of a gap between the nozzle outlet aperture and the diffusor inlet aperture or by the use of a diffusor having one or more apertures or passages in the first, narrow third of its length (beginning at the diffusor inlet aperture).

Mixing is further improved if the aqueous monomer emulsion emerging from the nozzle is passed first through a downstream mixing chamber and only then into the polymerization reactor. The form of the mixing chamber is of relatively minor importance. What is important is that its internal volume is such that there is at least one complete replacement of the contents of the mixing chamber on average per hour for a given volume flow. More favorable, however, is a volume which ensures higher replacement rates, such as, for example, at least 5-, 10-, 20-, 50-, 100-, 200-, 400-, 600- or 1 000-fold replacement per hour. It has proven favorable for the minimum cross-sectional area of the mixing chamber to be at least 200, 350, 500 or 1 000 times the nozzle cross-sectional area and for the minimum length of the mixing chamber to be at least 20, 40, 60, 80 or 100 times the square root of the nozzle cross-sectional area.

Aqueous monomer emulsions suitable for the process of the invention comprise a) at least one ethylenically unsaturated monomer,
b) at least one dispersant,
c) if desired, at least one initiator apt to initiate aqueous emulsion polymerizations,
d) if desired, further additives.

Component a)

Monomers that can be used for the process of the invention are monoesters or diesters of ethylenically unsaturated $C_3$ to $C_6$ monocarboxylic or dicarboxylic acids with $C_1$ to $C_{20}$ alkanols or diols, vinyl esters of $C_1$ to $C_{20}$ monocarboxylic acids, vinylaromatic compounds, ethylenically unsaturated nitriles, vinyl halides, $C_1$ to $C_{20}$ alkyl vinyl ethers, $C_2$ to $C_8$ monoolefins and diolefins, $C_3$ to $C_6$ monoethylenically unsaturated monocarboxylic or dicarboxylic acids, their salts or their amides and N-mono- or N,N-di ($C_1$–$C_{20}$ alkyl)amides or hydroxyalkylamides, N-vinyllactams, ethylenically unsaturated alkyl- or arylsulfonic acids and/or their salts, and mixtures of different monomers of one type and/or of different types.

Examples of suitable monomers are esters of acrylic acid or methacrylic acid with methanol, ethanol, n-propanol, isopropanol, n-butanol, isobutanol, sec-butanol, tert-butanol, pentanol, hexanol, 2-ethylhexanol, octanol, decanol, dodecanol or stearyl alcohol, vinyl formate, vinyl acetate, vinyl propionate, styrene, α-methylstyrene, acrylonitrile, methacrylonitrile, acrylic acid, methacrylic acid, acrylamide, methacrylamide, vinyl chloride, vinylidene chloride, vinyl ethyl ether, ethylene, propylene, butadiene, isoprene, N-vinylpyrrolidone, vinylsulfonic acid and its alkali metal salts, acrylamidopropanesulfonic acid and its alkali metal salts, sulfonated styrene and its alkali metal salts, acrylic acid, methacrylic acid, maleic acid, fumaric acid, itaconic acid, etc.

Examples of further monomers a), present generally in minor amounts, include N-alkyl- and N-hydroxyalkylamides of the aforementioned ethylenically unsaturated carboxylic acids, the diesters of dihydric alcohols with the aforementioned ethylenically unsaturated monocarboxylic acids, the vinyl or allyl esters of the ethylenically unsaturated carboxylic acids, N,N'-divinyl- or N,N'-diallylurea derivatives or divinylaromatics.

Particularly suitable monomer combinations for the process of the invention comprise as principal monomers, for example, n-butyl acrylate and vinyl acetate; n-butyl acrylate and styrene; n-butyl acrylate and ethylhexyl acrylate; butadiene and styrene; butadiene, acrylonitrile and/or methacrylonitrile; butadiene, isoprene, acrylonitrile and/or methacrylonitrile; butadiene and acrylic esters, and butadiene and methacrylic esters. All the said monomer combinations may further comprise small amounts of other monomers, preferably acrylic acid, methacrylic acid, acrylamide and/or methacrylamide.

Component b)

As at least one dispersant it is possible to use emulsifiers and/or protective colloids. These substances are commonly used in amounts of up to 10% by weight, preferably from 0.5 to 5% by weight and in particular from 0.5 to 3% by weight, based on the monomers to be polymerized.

Examples of suitable protective colloids are polyvinyl alcohols, cellulose derivatives, or copolymers based on vinylpyrrolidone. Suitable emulsifiers are, in particular, anionic and nonionic emulsifiers, such as ethoxylated mono-, di- and trialkylphenols, ethoxylates of long-chain alkanols, alkali metal salts and ammonium salts of alkyl sulfates, of sulfuric monoesters with ethoxylated alkanols and ethoxylated alkylphenols, of alkylsulfonic acids and of alkylarylsulfonic acids. A lengthy description of protective colloids and emulsifiers can be found in Houben-Weyl, Methoden der Organischen Chemie, volume XIV/1, Makromolekulare Stoffe [Macromolecular substances], Georg-Thieme-Verlag, Stuttgart, 1961, pp. 192–208 and 411–420.

Nonionic emulsifiers which can be used are araliphatic or aliphatic nonionic emulsifiers, examples being ethoxylated mono-, di- and trialkylphenols (degree of ethoxylation: from 3 to 50, alkyl radical: $C_4$–$C_{10}$), ethoxylates of long-chain alcohols (degree of ethoxylation: from 3 to 50, alkyl radical: $C_8$–$C_{36}$), and also polyethylene oxide/polypropylene oxide block copolymers. Preference is given to ethoxylates of long-chain alkanols (alkyl radicals: $C_{10}$–$C_{22}$, degree of ethoxylation from 10 to 50) and, of these, particular preference to those having a linear $C_{12}$–$C_{18}$ alkyl radical and a degree of ethoxylation of from 10 to 50, and also ethoxylated monoalkylphenols. The degree of ethoxylation figures relate in each case to the average degree of ethoxylation.

Examples of suitable anionic emulsifiers are alkali metal salts and ammonium salts of alkyl sulfates (alkyl radical: $C_8$–$C_{12}$), of sulfuric monoesters with ethoxylated alkanols (degree of ethoxylation: from 2 to 50, alkyl radical: $C_{12}$–$C_{18}$) and ethoxylated alkylphenols (degree of ethoxylation: from 3 to 50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers can be found in Houben-Weyl, Methoden der organischen Chemie, volume XIV/1, Makromolekulare Stoffe, Georg-Thieme-Verlag, Stuttgart, 1961, pp. 192–208. Suitable anionic emulsifiers likewise include bis(phenylsulfonic acid) ethers and their alkali metal salts or ammonium salts, which carry a $C_4$–$C_{24}$ alkyl group on one or both aromatic rings. These compounds are widely known, from U.S. Pat. No. 4,269,749 for example, and are available commercially, as Dowfax® 2A1 (trademark of Dow Chemical Company), for example.

Suitable cationic emulsifiers are preferably quaternary ammonium halides, e.g., trimethylcetylammonium chloride, methyltrioctylammonium chloride, benzyltriethylammonium chloride, or quaternary compounds of N-($C_6$–$C_{20}$ alkyl)pyridines, N-($C_6$–$C_{20}$ alkyl)morpholines or N-($C_6$–$C_{20}$ alkyl)imidazoles, e.g., N-laurylpyridinium chloride.

Component c)

Suitable free-radical polymerization initiators include all those which are capable of setting off a free-radical aqueous emulsion polymerization. They may comprise either peroxides, e.g., alkali metal peroxodisulfates, or azo compounds. Use is also made of combined systems which are composed of at least one organic or inorganic reductant and at least one peroxide and/or hydroperoxide, an example being tert-butyl hydroperoxide with the sodium salt of hydroxymethanesulfinic acid or hydrogen peroxide with ascorbic acid. Use is also made of combined systems which include a small amount of a metal compound which is soluble in the polymerization medium and whose metallic component is able to exist in a plurality of valence states, e.g., ascorbic acid/iron(II) sulfate/hydrogen peroxide, in which in many cases the ascorbic acid may be replaced by the sodium salt of hydroxymethanesulfinic acid, sodium sulfite, sodium hydrogen sulfite or sodium bisulfite and the hydrogen peroxide by tert-butyl hydroperoxide or alkali peroxodisulfates and/or ammonium peroxodisulfate. Preferred initiators are the ammonium or alkali metal salts of peroxosulfates or peroxodisulfates, especially sodium or potassium peroxodisulfate. The amount of free-radical initiator systems used, based on the overall amount of the monomers to be polymerized, is preferably from 0.1 to 3% by weight.

Component d)

In order to control the molecular weight it is possible to use customary regulators, examples being mercapto compounds, such as mercaptoethanol, mercaptopropanol, mercaptobutanol, mercaptoacetic acid, mercaptopropionic acid, mercaptotrimethoxysilane, butyl mercaptan and tert-dodecyl mercaptan. Also suitable are organic halogen compounds, such as carbon tetrachloride or bromotrichloromethane. Examples of further suitable additives include pH modifiers, antioxidants, deodorants, biocides, crosslinkers, dyes, pigments, etc.

The emulsion prepared in accordance with the invention is polymerized in a reactor suitable for this purpose. Such reactors include, for example, stirred reactors, tank cascades, and unstirred reactors, such as tube reactors. The emulsion polymerization of the continuously prepared monomer emulsions may then be carried out in a semibatch or continuous process.

If the polymerization is not carried out continuously, but instead is carried out as a semibatch process, then some of the continuous phase may be included in the initial charge; that is, the reactor is filled proportionally with water and, if desired, at least one surface-active substance and/or at least one monomer.

The polymerization may also take place with the use of a seed latex, which in the case of a semibatch procedure may be prepared in the reactor vessel at the beginning of the reaction or may be added as a component to the other components of the monomer emulsion prior to entry into the mixing means. Where a tube reactor is used, the seed latex may be prepared separately or in the first part of the reactor. In the latter case, the monomers to be polymerized are then fed in after the seed has been formed.

The process of the invention is especially suitable for the preparation of polymer dispersions having a solids content of up to 75% by weight, but preferably from 40 to 60% by weight. The disadvantages known from the prior art, particularly as a consequence of complete or partial separation of separately prepared (preemulsified) monomer emulsions, are avoided.

The following, nonrestrictive examples illustrate the invention.

EXAMPLES

In order to demonstrate the advantageous preparation of the aqueous monomer emulsion by means of a nozzle, the components stated in the examples were supplied, without premixing, by way of a common feed line, through the mixing device, and immediately thereafter to the polymerization vessel. The mixing device used in accordance with the invention was an injector nozzle, model 803, size 1 from Düsen-Schlick GmbH, Untersiemau, Germany, installed in a cylindrical mixing chamber having a diameter of 40 mm and a length of 250 mm, while in the comparative tests, carried out in the same way, a static mixer was used which was composed of 10 mixing elements of the type SMX-S from Sulzer Chemtech GmbH, Ober-Mörlen, Germany. In a further comparative test, the aqueous monomer emulsion was prepared separately in a 100 l stirred tank equipped with a multistage pulsed countercurrent stirrer (MIG stirrer) at 90 revolutions per minute and was metered directly via a feed line into the polymerization reactor.

Analysis and Evaluation

The solids content was determined by drying an aliquot of the aqueous polymer dispersion to constant weight in a drying oven at 140° C. Two separate measurements were carried out. The value reported represents the mean of the two measurement results.

The amount of coagulum was determined by filtration through a metal sieve having a mesh size of 45 $\mu$m. 100 g of the aqueous polymer dispersion were filtered through the 45 $\mu$m sieve, which was weighed prior to filtration, at from 20 to 25° C. (room temperature). Following filtration, the sieve was rinsed with a little deionized water and then dried to constant weight in a drying oven at 100° C. under atmospheric pressure. After cooling to room temperature, the sieve was weighed again. The amount of coagulum was the result of the difference between the individual weighings, in each case based on the amount of aqueous polymer dispersion filtered.

The polymer deposits on reactor wall and stirrer were evaluated using the following scale:

1=no deposit
2=slight deposit
3=severe deposits

Example 1

15 kg of deionized water, 0.06 kg of sodium peroxodisulfate and 0.9 kg of an aqueous seed latex dispersion (30% by weight polystyrene particles, number-average particle diameter 33 nm) were charged under nitrogen and at atmospheric pressure to a 120 l stirred reactor and were heated to 85° C. with stirring (MIG stirrer, 80 revolutions per minute). Over the course of 4 hours, via a feed line that contained the mixing device, the components which form the monomer emulsion, namely

| | |
|---|---|
| 22.0 kg | of deionized water |
| 1.3 kg | of a 28% strength by weight aqueous solution of Texapon ® NSO-IS (ethoxylated fatty alcohol sulfate; trademark of Cognis Deutschland GmbH) |
| 1.4 kg | of acrylic acid |
| 1.0 kg | of a 50% strength by weight aqueous solution of acrylamide |
| 29.0 kg | of styrene |
| 17.5 kg | of butadiene and |
| 0.9 kg | of tert-dodecyl mercaptan | and, via a separate feed line but simultaneously, an initiator solution composed of

| | |
|---|---|
| 0.6 kg | of sodium peroxodisulfate and |
| 6.0 kg | of deionized water | were metered into the reaction mixture which was stirred at 85° C. Afterward, reaction was allowed to continue at the reaction temperature for 1 hour, with stirring. The stirred reactor was then evacuated to an underpressure of 300 mbar (absolute), during which 4 bar steam was passed through the aqueous polymer dispersion. After 1 hour, the supply of steam was interrupted, the underpressure was removed using nitrogen, the polymer dispersion was cooled to room temperature and its pH was adjusted to 7 using a 20% strength by weight aqueous sodium hydroxide solution. The aqueous polymer dispersion had a solids content of 50.9% by weight.

The polymer dispersion and also the reactor and the stirrer were evaluated as follows:

| Mixing device | Coagulum >45 [ppm] | Deposits, reactor wall | Deposits, stirrer |
|---|---|---|---|
| Injector nozzle | 10 | 1 | 1 |
| Static mixer | 30 | 2–3 | 3 |

Example 2

12 kg of deionized water, 0.06 kg of sodium peroxodisulfate and 0.2 kg of an aqueous seed latex dispersion (30% by weight polystyrene particles, number-average particle diameter 33 nm) were charged under nitrogen and at atmospheric pressure to a 120 l stirred reactor and were heated to 85° C. with stirring (MIG stirrer, 80 revolutions per minute). Over the course of 3.5 hours, via a feed line that contained the mixing device, the components which form the monomer emulsion, namely

| | |
|---|---|
| 18.0 kg | of deionized water |
| 1.9 kg | of a 30% strength by weight aqueous solution of Disponil ® FES 77 (sulfonated alkylphenol ethoxylate; trademark of Cognis Deutschland GmbH) |
| 1.0 kg | of acrylic acid |
| 5.5 kg | of a 15% strength by weight aqueous solution of N-methylolmethacrylamide |
| 5.4 kg | of acrylonitrile |
| 38.9 kg | of 2-ethylhexyl acrylate and |
| 0.8 kg | of styrene | and, via a separate feed line but over 4 hours and 15 minutes, an initiator solution composed of

| | |
|---|---|
| 0.6 kg | of sodium peroxodisulfate and |
| 7.0 kg | of deionized water | were metered into the reaction mixture which was stirred at 85° C. Afterward, the reaction was allowed to continue at the reaction temperature for 1 hour, with stirring. The stirred reactor was then evacuated to an underpressure of 300 mbar (absolute), during which 4 bar steam was passed through the aqueous polymer dispersion. After 1 hour, the supply of steam was interrupted, the underpressure was removed using nitrogen, the polymer dispersion was cooled to room temperature and its pH was adjusted to 7 using aqueous ammonia solution. The aqueous polymer dispersion had a solids content of 51.9% by weight.

The polymer dispersion and also the reactor and the stirrer were evaluated as follows:

| Mixing device | Coagulum >45 [ppm] | Deposits, reactor wall | Deposits, stirrer |
|---|---|---|---|
| Injector nozzle | 30 | 1 | 1 |
| Static mixer | 220 | 3 | 3 |

Example 3

12 kg of deionized water and 0.15 kg of an aqueous seed latex dispersion (30% by weight of polystyrene particles, number-average particle diameter 33 nm) were charged under nitrogen and at atmospheric pressure to a 120 l stirred reactor and were heated to 80° C. with stirring (MIG stirrer, 80 revolutions per minute). Over the course of 4.5 hours, via a feed line that contained the injector nozzle, the components which form the monomer emulsion, namely

| | |
|---|---|
| 20.0 kg | of deionized water |
| 1.3 kg | of a 45% strength by weight aqueous solution of Dowfax ® 2A1 |
| 2.8 kg | of a 30% strength by weight aqueous solution of Disponil ® FES 77 |

-continued

| | |
|---|---|
| 1.3 kg | of acrylic acid |
| 1.4 kg | of a 50% strength by weight aqueous solution of acrylamide |
| 14.0 kg | of vinyl acetate |
| 19.0 kg | of n-butyl acrylate and |
| 13.0 kg | of 2-ethylhexyl acrylate, | and over the same time, via two separate feed lines, an initiator solution 1 composed of

| | |
|---|---|
| 2.5 kg | of a 10% strength by weight aqueous solution of ascorbic acid | and an initiator solution 2 composed of

| | |
|---|---|
| 0.3 kg | of a 50% strength by weight aqueous solution of hydrogen peroxide; | were metered into the reaction mixture which was stirred at 80° C. In a comparative test, the components which form the monomer emulsion were mixed at room temperature in a 100 l stirred tank to form a stable monomer emulsion which was supplied to the polymerization vessel over the course of 4.5 hours via a feed line without mixing device. The initiator system was supplied in the same way as described above.

Afterward, reaction was allowed to continue at the reaction temperature for 1 hour, with stirring. The stirred reactor was then evacuated to an underpressure of 300 mbar (absolute), in the course of which 4 bar steam was passed through the aqueous polymer dispersion. After 1 hour, the supply of steam was interrupted and the underpressure was removed using nitrogen, the polymer dispersion was cooled to room temperature and its pH was adjusted to 7 using a 20% strength by weight aqueous sodium hydroxide solution. The aqueous polymer dispersion had a solids content of 56.1% by weight.

The polymer dispersion and also the reactor and the stirrer were evaluated as follows:

| Mixing device | Coagulum >45 [ppm] | Deposits, reactor wall | Deposits, stirrer |
|---|---|---|---|
| Injector nozzle | 40 | 1 | 1 |
| Stirred tank | 70 | 2–3 | 2–3 |

As the results of the inventive experiments relative to the comparative tests demonstrate, the resulting aqueous polymer dispersions have significantly lower coagulum contents, and there is a significantly reduced amount of deposits on reactor walls and stirrers, when a nozzle is used.

We claim:

1. A process for preparing an aqueous polymer dispersion by free-radical emulsion polymerization of an aqueous monomer emulsion wherein said aqueous monomer emulsion is formed continuously at the rate of its consumption over a mixing means, wherein said mixing means comprises a baffle or a nozzle wherein said nozzle is at least one nozzle selected from the group consisting of a solid cone nozzle, a hollow cone nozzle, a fan jet nozzle, a smooth jet nozzle, an injector nozzle, an ejector nozzle, a spiral nozzle, an impingement jet nozzle, and a two-fluid nozzle, wherein said mixing means further comprises a mixing chamber;

wherein the components of the aqueous emulsion are passed first through a nozzle then through the mixing chamber; and wherein there is at least a 5-fold replacement of the contents of the mixing chamber on average per hour.

2. A process as claimed in claim 1, wherein the nozzle has a pressure difference between an inlet aperture and a nozzle outlet aperture of at least 0.5 bar.

3. A process as claimed in claim 1, wherein a diffusor is mounted at a nozzle outlet aperture of the nozzle.

4. A process as claimed in claim 3, wherein the diffusor has one or more apertures.

5. A process as claimed in claim 2, wherein the mixing chamber has a minimum cross-sectional area of at least 200 times the nozzle cross-sectional area and the mixing chamber has a minimum length which is at least 20 times the square root of the nozzle cross-sectional area.

6. A process as claimed in claim 1, wherein said aqueous monomer emulsion comprises a) at least one ethylenically unsaturated monomer, b) at least one dispersant.

7. A process as claimed in claim 6, wherein at least one ethylenically unsaturated monomer is selected from the group consisting of esters of ethylenically unsaturated $C_3$ to $C_6$ monocarboxylic or dicarboxylic acids with $C_1$ to $C_{20}$ alkanols, vinyl esters of $C_1$ to $C_{20}$ monocarboxylic acids, vinylaromatics, ethylenically unsaturated nitriles, vinyl halides, $C_1$ to $C_{20}$ alkyl vinyl ethers, aliphatic hydrocarbons having from 2 to 8 carbon atoms and 1 or 2 double bonds, ethylenically unsaturated $C_3$ to $C_6$ monocarboxylic or dicarboxylic acids and their amides, N-vinyllactams, and ethylenically unsaturated alkyl- or arylsulfonic acids.

8. A process as claimed in claim 6, wherein said at least one monomer is selected from the group consisting of $C_1$ to $C_{12}$ alkyl acrylates, $C_1$ to $C_{12}$ alkyl methacrylates, vinyl formate, vinyl acetate, vinyl propionate, styrene, α-methylstyrene, acrylonitrile, methacrylonitrile, acrylic acid, methacrylic acid, acrylamide, methacrylamide, vinyl chloride, vinyl ethyl ether, ethylene, propylene, butadiene, isoprene, and N-vinylpyrrolidone.

9. The process as claimed in claim 6, wherein the ethylenically unsaturated monomer comprises at least one alkyl acrylate or alkyl methacrylate.

10. The process as claimed in claim 8, wherein the at least one ethylenically unsaturated monomer is selected from the group consisting of n-butyl acrylate, 2-ethylhexyl acrylate, and methyl methacrylate.

11. A process as claimed in claim 6, wherein said aqueous monomer emulsion further comprises c) at least one initiator capable of initiating an aqueous emulsion polymerization.

12. A process as claimed in claim 6, wherein said aqueous monomer emulsion further comprises d) further additives.

* * * * *